(12) United States Patent
Otaki

(10) Patent No.: US 9,772,989 B2
(45) Date of Patent: Sep. 26, 2017

(54) TEMPLATE MANAGEMENT APPARATUS, NON-TRANSITORY COMPUTER READABLE MEDIUM, AND TEMPLATE MANAGEMENT METHOD

(71) Applicant: FUJI XEROX CO., LTD., Tokyo (JP)

(72) Inventor: Masanobu Otaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 289 days.

(21) Appl. No.: 14/558,175

(22) Filed: Dec. 2, 2014

(65) Prior Publication Data
US 2015/0363381 A1 Dec. 17, 2015

(30) Foreign Application Priority Data
Jun. 11, 2014 (JP) ................................. 2014-121000

(51) Int. Cl.
*G06F 17/24* (2006.01)
(52) U.S. Cl.
CPC .................................. *G06F 17/248* (2013.01)
(58) Field of Classification Search
None
See application file for complete search history.

(56) References Cited

U.S. PATENT DOCUMENTS

| | | | |
|---|---|---|---|
| 7,610,548 B1* | 10/2009 | Brinkman | G06F 17/248 707/999.103 |
| 2007/0233547 A1* | 10/2007 | Younger | G06F 17/248 705/7.14 |
| 2008/0288239 A1* | 11/2008 | Bailey | G06F 17/248 704/2 |
| 2011/0264439 A1* | 10/2011 | Sata | G06F 17/2827 704/4 |
| 2012/0054599 A1* | 3/2012 | Nixon | G05B 19/4183 715/236 |
| 2014/0237331 A1* | 8/2014 | Brooks | G06Q 10/00 715/202 |
| 2014/0288946 A1* | 9/2014 | Shinohara | G06Q 30/0241 705/2 |

FOREIGN PATENT DOCUMENTS

JP 05-151258 A 6/1993

\* cited by examiner

*Primary Examiner* — Stephen Hong
*Assistant Examiner* — Sanchita Roy
(74) *Attorney, Agent, or Firm* — Sughrue Mion, PLLC

(57) ABSTRACT

A template management apparatus includes a standard format classifying part, a group classifying part, and a replacing part. The standard format classifying part classifies a sample character string included in a template, as a standard format character string or a non-standard format character string. The group classifying part classifies the standard format character string into a standard format character string group according to its representation format, and classifies the non-standard format character string into a non-standard format character string group according to its content. The replacing part replaces the sample character string classified into the standard format character string group, with a replacement standard format character string represented in a representation format corresponding to the sample character string, and replaces the sample character string classified into the non-standard format character string group, with a replacement non-standard format character string represented in a different language from the sample character string.

8 Claims, 10 Drawing Sheets

FIG. 4

| TEMPLATE ID | THUMBNAIL ID |
|---|---|
| 1021 | xab0234eaeee |
| 1022 | Pliega84kq32 |
| 1023 | 88ieka0e8aee |
| ...... | |

| TEMPLATE ID | SAMPLE INFORMATION ID | SAMPLE CHARACTER STRING |
|---|---|---|
| 1021 | 1 | 新装オープン |
| 1021 | 2 | この度、新しくオープンする事になりました。みなさまのお越しを心からお待ちしております。 |
| 1021 | 3 | 〒123-2454　横浜市西区みなとみらい1-6 |
| 1021 | 4 | 045-111-1111 |
| 1021 | 5 | 2014年4月12日 |
| 1022 | 1 | xxxxxxxx |
| ...... | | |

FIG. 5

| STANDARD FORMAT WORD ID | ATTRIBUTE (TYPE) | REPRESENTATION FORMAT |
|---|---|---|
| 1 | TELEPHONE NUMBER | nnn-nnnn-nnnn |
| 2 | TELEPHONE NUMBER | nn-nnnn-nnnn |
| 3 | TELEPHONE NUMBER | 080-nnnn-nnnn |
| 4 | ADDRESS | 東京都 xxxxxxx |
| 5 | YEAR-MONTH-DAY DATE | yyyy/mm/dd |

FIG. 9

NON-STANDARD FORMAT CHARACTER STRING GROUP (C)

[SET] [CANCEL]

SAMPLE CHARACTER STRING

| SAMPLE CHARACTER STRING | TEMPLATE ID | SAMPLE INFORMATION ID | REMARKS |
|---|---|---|---|
| 新装開店 | 00001 | 1 | |
| オープン!! | 00002 | 3 | |
| ...... | | | |

REPLACEMENT CHARACTER STRING SETTING

CANDIDATE 1: xxxxxxxxxxxxxxxxxxxx
CANDIDATE 2: xxxxxxxxxx
CANDIDATE 3: xxxxxxxxxxxx
CANDIDATE 4: xxxxxxxxx
CANDIDATE 5: xxxxxxxxx

[SET] [CANCEL]

TEMPLATE MANAGEMENT APPARATUS, NON-TRANSITORY COMPUTER READABLE MEDIUM, AND TEMPLATE MANAGEMENT METHOD

CROSS-REFERENCE TO RELATED APPLICATIONS

This application is based on and claims priority under 35 USC 119 from Japanese Patent Application No. 2014-121000 filed Jun. 11, 2014.

BACKGROUND (i) Technical Field

The present invention relates to a template management apparatus, a non-transitory computer readable medium, and a template management method.

(ii) Related Art

Techniques for creating documents such as fliers, advertisements, direct mails (DMs), posters, postcards, and catalogs exist. For example, there are cases where multiple types of templates with different designs are prepared, and a user chooses a template and edits the template to create a document.

There are cases where a character string serving as a sample (sample character string) is included in a template in advance. For example, in some cases, a sample character string is included in a template to let the user easily understand which kind of scene each individual template is suited for. In this case, the user edits the sample character string to create a document such as a flier or an advertisement suited for the user's purpose.

For users in a country in which a template is used, it is more convenient if a sample character string in the template is represented in the language of the country. For example, if a template is to be used in Japan, it is more convenient for users of the template in Japan if the sample character string is represented in Japanese. If a template is to be used in a country where English is used, it is more convenient for users of the template in that country if the sample character string is represented in English.

In the case mentioned above, it is necessary to prepare sample character strings represented in the languages of the respective countries. To this end, for example, the following approach is conceivable: if a template including sample character strings represented in a given language (for example, Japanese) has already been created, each sample character string represented in Japanese is individually translated into another language (for example, English), and each of the translated sample character strings is individually set again for the template. This approach requires individually translating all sample character strings in all templates, and individually setting the translated sample character strings for the templates again. Consequently, translating and resetting sample character strings requires a lot of time and trouble, which means that it is not easy to create a template represented in a language different from the original language.

SUMMARY

According to an aspect of the invention, there is provided a template management apparatus including a standard format classifying part that, in response to reception of a template used to create a design and including a sample character string previously created as a sample, classifies the sample character string as one of a standard format character string and a non-standard format character string, a group classifying part that classifies the sample character string classified as the standard format character string into a standard format character string group according to a representation format of the sample character string, and classifies the sample character string classified as the non-standard format character string into a non-standard format character string group according to content of the sample character string, and a replacing part that performs a replacement, the replacement including replacing the sample character string classified into the standard format character string group with a replacement standard format character string, the replacement standard format character string being associated with the standard format character string group and represented in a representation format corresponding to the sample character string, and replacing the sample character string classified into the non-standard format character string group with a replacement non-standard format character string, the replacement non-standard format character string being associated with the non-standard format character string group and represented in a different language from the sample character string.

BRIEF DESCRIPTION OF THE DRAWINGS

Exemplary embodiment of the present invention will be described in detail based on the following figures, wherein:

FIG. 4 illustrates a template management table;

FIG. 5 illustrates a standard format word dictionary;

FIG. 9 illustrates a screen for entering replacement character string candidates.

DETAILED DESCRIPTION

Figure 1:
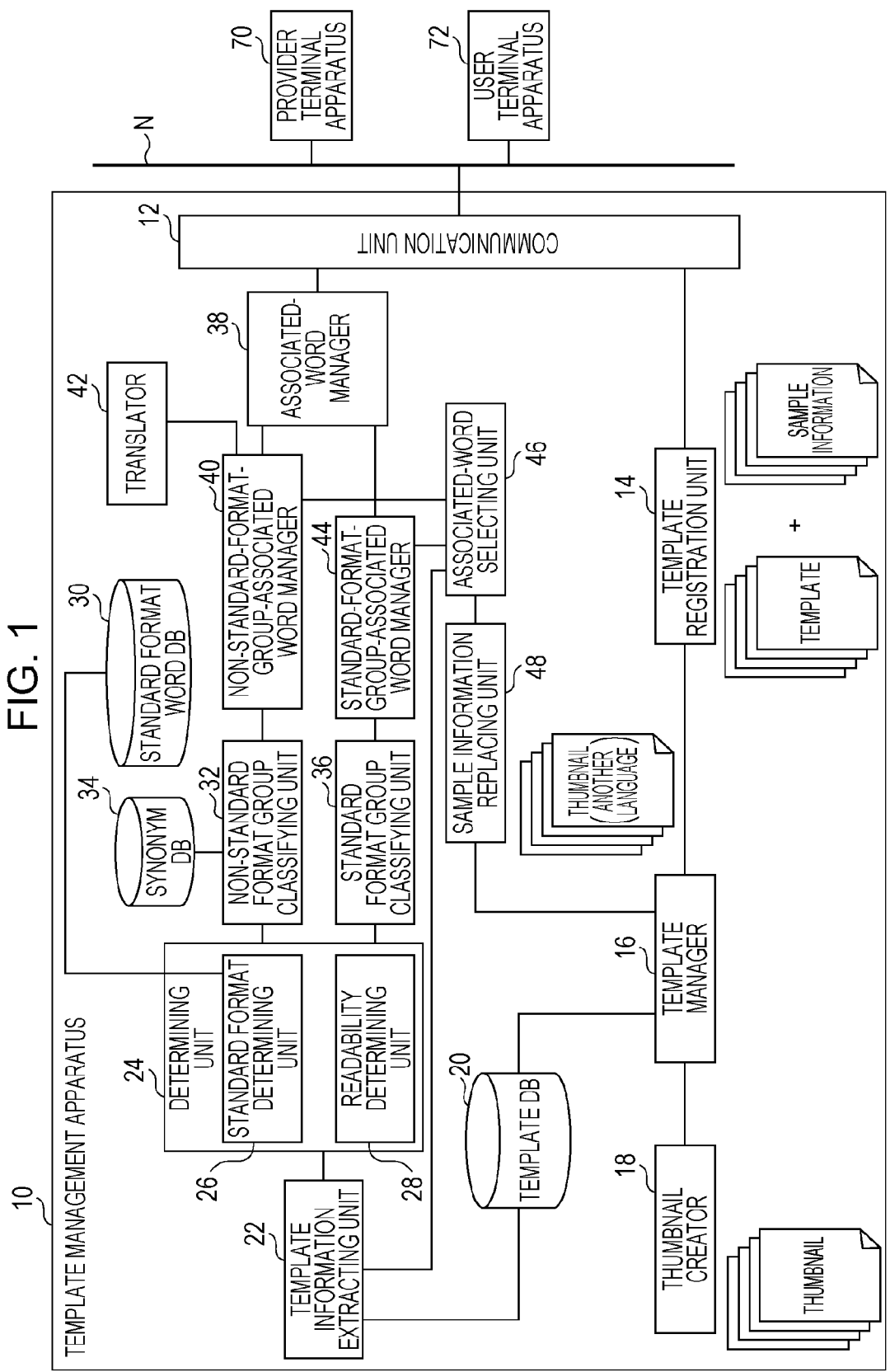
FIG. 1 is a block diagram illustrating a template management apparatus according to an exemplary embodiment of the invention.

FIG. 1 illustrates a template management system according to an exemplary embodiment of the invention. The template management system according to the exemplary embodiment includes, for example, a template management apparatus 10, a provider terminal apparatus 70, and a user terminal apparatus 72. For example, the template management apparatus 10 according to the exemplary embodiment is connected to the provider terminal apparatus 70 and the user terminal apparatus 72 via a communication path N such as a network. While in FIG. 1 a single provider terminal apparatus 70 and a single user terminal apparatus 72 are connected to the template management apparatus 10 via the communication path N, multiple provider terminal apparatuses 70 and multiple user terminal apparatuses 72 may be connected to the template management apparatus 10 via the communication path N.

The template management apparatus 10 has the function of transmitting and receiving data to and from the provider terminal apparatus 70 and the user terminal apparatus 72. The template management apparatus 10 stores templates (template data) for creating documents, and has the function of providing a template as required.

The provider terminal apparatus 70 is a terminal apparatus used by a provider who provides a template (to be also referred to simply as "provider" hereinafter). The provider terminal apparatus 70 has the function of transmitting and receiving data to and from the template management apparatus 10. A template is created by the provider, and transmitted from the provider terminal apparatus 70 to the template management apparatus 10 and stored on the template management apparatus 10.

The user terminal apparatus 72 is a terminal apparatus used by a user who creates a document by editing a template. The user terminal apparatus 72 has the function of transmitting and receiving data to and from the template management apparatus 10. A template is transmitted from the template management apparatus 10 to the user terminal apparatus 72, and displayed on the user terminal apparatus 72. Then, the template is edited by the user.

For example, each of the provider terminal apparatus 70 and the user terminal apparatus 72 is an apparatus such as a personal computer, a tablet PC, a smartphone, or a cellular phone, and includes an operating unit such as a keyboard or a mouse, a display, a communication unit that functions as a network interface, and a controller including a CPU. The provider terminal apparatus 70 and the user terminal apparatus 72 may be incorporated in the template management apparatus 10.

In the template management system according to the exemplary embodiment, for instance, a template is transmitted from the provider terminal apparatus 70 to the template management apparatus 10, and the template is registered on the template management apparatus 10. Then, upon request from the user, the template is transmitted from the template management apparatus 10 to the user terminal apparatus 72. On the user terminal apparatus 72, the template is edited by a user's operation.

Hereinafter, the template management apparatus 10 will be described.

A communication unit 12 is a network interface. The communication unit 12 has the function of transmitting and receiving data to and from the provider terminal apparatus 70 and the user terminal apparatus 72. For example, the communication unit 12 receives a template from the provider terminal apparatus 70 via the communication path N. The communication unit 12 also transmits a template to the user terminal apparatus 72 via the communication path N.

A template registration unit 14 receives a template and sample information from the provider terminal apparatus 70, and registers the template and the sample information on the template management apparatus 10. For example, the template registration unit 14 generates template identification information (for example, a template ID) for identifying a template, and assigns the template identification information to the template. A template is, for example, data in a prescribed format used for creating documents such as fliers, advertisements, direct mails (DMs), posters, postcards, and catalogs. Sample information is information indicating a character string created as a sample (to be referred to as "sample character string" hereinafter). Sample information is included in a template. A sample character string represents information that is permitted for editing by the user. A detailed description of a template and sample information will be given later.

A template manager 16 has the function of adding, deleting, editing, and displaying a template. For example, the template manager 16 stores a template and sample information into a template database (DB) 20. The template manager 16 also has the function of causing a template to be displayed on a terminal apparatus such as the provider terminal apparatus 70 or the user terminal apparatus 72. For example, the template manager 16 has functions such as displaying a thumbnail image (reduced image) of a template on a terminal apparatus, displaying a retrieved template or its thumbnail image on the terminal apparatus, and displaying a specified template on the terminal apparatus.

A thumbnail creator 18 creates a thumbnail image of a template including sample information. The reduction ratio of an image may be determined in advance, or may be determined by the provider of the template.

The template DB 20 stores the real data (template data), sample information, and thumbnail image data of each template. For example, the real data of multiple types of templates with different designs, the sample information of each template, and thumbnail image data of each template are stored in the template DB 20. The real data of each template, and the sample information and thumbnail image of the template are stored in the template DB 20 in association with each other.

A template information extracting unit 22 acquires a template, sample information, and a thumbnail image from the template DB 20.

A determining unit 24 includes a standard format determining unit 26 and a readability determining unit 28.

The standard format determining unit 26 determines whether each sample character string included in each template is a character string in a standard format, and classifies each sample character string as a standard format character string or a non-standard format character string. For example, the standard format determining unit 26 classifies a sample character string as a standard format character string or a non-standard format character string by using standard format word directory information stored in a standard format word DB 30. Specifically, for instance, if a sample character string is represented in a representation format such as a telephone number, an address, or a year-month-day date, the sample character string is classified as a standard format character string. A sample character string that is not represented in the standard representation format is classified as a non-standard format character string.

The readability determining unit 28 determines whether each sample character string shown in a thumbnail image of each template is readable, and classifies each sample character string as a readable character string or an unreadable character string. The term "readable" as used herein means visible by the user, and a readable sample character string means a character string with a font size large enough for the user to see. For example, the readability determining unit 28 performs OCR on a thumbnail image of a template. If a sample character string shown in the thumbnail image is recognized as a character string by OCR, the readability determining unit 28 classifies this sample character string as a readable character string. If a sample character string shown in the thumbnail image is not recognized as a character string by OCR, the readability determining unit 28 classifies this sample character string as an unreadable character string. Alternatively, if the font size of a sample character string (for example, the font size prior to creation of a thumbnail image) is larger than or equal to a reference font size, the readability determining unit 28 may classify this sample character string as a readable character string. If the font size is smaller than a reference font size, the readability determining unit 28 classifies this sample character string as an unreadable character string. The reference font size is a predetermined value, and may be changed by the provider of the template.

Through processing by the standard format determining unit 26 and the readability determining unit 28, each sample character string in each template is classified as one of the following character strings: a character string that is a readable and in a standard format (to be referred to as "readable standard format character string" hereinafter); a character string that is readable and in a non-standard format (to be referred to as "readable non-standard format character string" hereinafter); a character string that is unreadable and in a standard format (to be referred to as "unreadable standard format character string" hereinafter); and a character string that is unreadable and in a non-standard format (to be referred to as "unreadable non-standard format character string" hereinafter).

A non-standard format group classifying unit 32 classifies a sample character string classified as a readable non-standard format character string into a non-standard format character string group according to the content of the sample character string (the meaning represented by the sample character string). For example, the non-standard format group classifying unit 32 uses synonym dictionary information stored in a synonym DB 34 to classify each sample character string classified as a readable non-standard format character string into a different non-standard format character string group by meaning. As a result, sample character strings with identical meanings are classified into the same non-standard format character string group. The non-standard format group classifying unit 32 classifies each readable non-standard format character string in each template into a different non-standard format character string group by meaning.

A standard format group classifying unit 36 classifies a sample character string classified as a readable standard format character string into a standard format character string group according to the representation format of the sample character string. For example, the standard format group classifying unit 36 classifies each sample character string classified as a readable standard format character string into a different standard format character string group by the attribute (type) of the sample character string. As a result, sample character strings with the same attribute are classified into the same standard format character string group. Examples of an attribute of a sample character string include telephone number, address, and year-month-day date. A sample character string indicating a telephone number is classified into a standard format character string group of telephone number, a sample character string indicating an address is classified into a standard format character string group of address, and a sample character string indicating a year-month-day date is classified into a standard format character string group of year-month-day date. The standard format group classifying unit 36 classifies each readable standard format character string in each template into a different standard format character string group by attribute.

An associated-word manager 38 accepts information indicating a replacement character string candidate for a non-standard format character string group (to be referred to as "replacement non-standard format character string candidate" hereinafter), and information indicating a replacement character string candidate for a standard format character string group (to be referred to as "replacement standard format character string candidate" hereinafter). A replacement non-standard format character string candidate is a candidate of character string for replacing a sample character string (readable non-standard format character string) belonging to a non-standard format character string group. A replacement standard format character string candidate is a candidate of character string for replacing a sample character string (readable standard format character string) belonging to a standard format character string group. A replacement non-standard format character string candidate is a character string represented in a language different from the corresponding sample character string belonging to a non-standard format character string group. A replacement standard format character string candidate is a character string represented in a representation format identical to the corresponding sample character string belonging to a standard format character string group. If multiple non-standard format character string groups exist, the associated-word manager 38 accepts information indicating a replacement non-standard format character string candidate for each individual non-standard format character string group. Likewise, if multiple standard format character string groups exist, the associated-word manager 38 accepts information indicating a replacement standard format character string candidate for each individual standard format character string group. For example, a replacement non-standard format character string candidate and a replacement standard format character string candidate are entered by the provider by using the provider terminal apparatus 70. Multiple replacement non-standard format character string candidates may be entered for a single non-standard format character string group. Likewise, multiple replacement standard format character string candidates may be entered for a single standard format character string group. Information indicating a replacement standard format character string candidate may be stored on the template management apparatus 10 in advance.

A non-standard-format-group-associated word manager 40 associates a non-standard format character string group with a replacement non-standard format character string candidate for the non-standard format character string group. As a result, a sample character string (readable non-standard format character string) belonging to a non-standard format character string group is associated with a replacement non-standard format character string candidate represented in a language different from the sample character string. If multiple replacement non-standard format character string candidates are accepted for a single non-standard format character string group, the multiple replacement non-standard format character string candidates are associated with the non-standard format character string group. If the language of a replacement non-standard format character string candidate is the same as the language of a sample character string (readable non-standard format character string), a translator 42 translates the replacement non-standard format character string candidate into a character string represented in a language (for example, a language specified by the provider of a template) different from the readable non-standard format character string. For example, if a readable non-standard format character string and a replacement non-standard format character string candidate are represented in Japanese, the translator 42 translates the replacement non-standard format character string candidate into a language (for example, English) other than Japanese. The non-standard-format-group-associated word manager 40 associates the translated replacement non-standard format character string candidate with the corresponding non-standard format character string group.

A standard-format-group-associated word manager 44 associates a standard format character string group with a replacement standard format character string candidate for the standard format character string group. As a result, a sample character string (readable standard format character string) belonging to a standard format character string group is associated with a replacement standard format character string candidate. If multiple replacement standard format character string candidates are accepted for a single standard format character string group, the multiple replacement standard format character string candidates are associated with the standard format character string group.

An associated-word selecting unit 46 selects a replacement non-standard format character string from at least one replacement non-standard format character string candidate associated with a non-standard format character string group. For example, the associated-word selecting unit 46 selects a replacement non-standard format character string on the basis of the number of characters (to be also referred to as "character count" hereinafter) of a replacement non-standard format character string candidate. If multiple replacement non-standard format character string candidates are associated with a non-standard format character string group, the associated-word selecting unit 46 selects a replacement non-standard format character string from among the multiple replacement non-standard format character string candidates. Further, the associated-word selecting unit 46 selects a replacement standard format character string from at least one replacement standard format character string candidate associated with a standard format character string group. For example, the associated-word selecting unit 46 selects a replacement standard format character string on the basis of the character count of the replacement standard format character string candidate. If multiple replacement standard format character string candidates are associated with a standard format character string group, the associated-word selecting unit 46 selects a replacement standard format character string from among the multiple replacement standard format character string candidates.

A sample information replacing unit 48 replaces, for each template, a sample character string (readable standard format character string) classified into a standard format character string group, with a replacement standard format character string that is associated with the standard format character string group and represented in a representation format corresponding to the sample character string. Further, the sample information replacing unit 48 replaces, for each template, a sample character string (readable non-standard format character string) classified into a non-standard format character string group, with a replacement non-standard format character string that is associated with the non-standard format character string group and represented in a different language from the sample character string.

The thumbnail creator 18 creates a thumbnail image of a template after a replacement. For example, this thumbnail image may be stored into the template DB 20, or may be output to an external apparatus.

The template management apparatus 10 may have a template editing function. In this case, the template management apparatus 10 edits a template specified by the user, in response to an instruction to edit the template which is given from the user terminal apparatus 72.

The template management apparatus 10 mentioned above is implemented by, for example, cooperation between hardware resources and software. Specifically, the template management apparatus 10 includes a processor such as a CPU (not illustrated). The functions of various units of the template management apparatus 10 are implemented as the processor reads and executes a program stored in a storage device (not illustrated). The above-mentioned program is stored into the storage device via a storage medium such as a CD or a DVD, or via a communication path such as a network. Alternatively, various units of the template management apparatus 10 may be implemented by hardware resources such as circuits.

Next, a template will be described. For example, a template is made up of at least one design component (design component data or object). An example of a design component is a character component, an image component, or a graphic component. A character component is made up of a string of characters. An example of a character component is a subject (title) or a body. An image component is, for example, image data in the bitmap format. A graphic component is, for example, graphic data represented in the vector format. A template is, for example, data including text data indicating a character component, image data indicating an image component, graphic data indicating a graphic component, data size information about each data, placement position information about each design component, and the like.

Each design component included in a template in advance is a sample that is created in advance. A design component as a sample is, for example, data that is created in advance by the provider of the template. When a design component as a sample is edited by the user, a new sample component is created and, as a result, a document with a design that is based on the template is created. A template may include, other than a design component that is permitted for editing by the user, a design component that is prohibited from editing by the user. For example, a character component (text) may be a design component that is permitted for editing by the user, and an image component may be a design component that is prohibited from editing by the user. Of course, an image component may be also permitted for editing by the user.

When editing a template, the user uses the user terminal apparatus 72 to edit the content of each individual design component. Editing includes manipulation and alteration of the content of a design component. For example, for character components such as a title or body, the character string, the type of the font, the front size, the color of characters, the placement position of characters, and the like are edited by the user. For an image component, the design of the image, the type of the image, the size of the image, the placement position of the image, and the like are edited by the user. For a graphic component, the color of the graphic, the transparency of the graphic (the degree of shading), the size of the graphic, the placement position of the graphic, and the like are edited by the user. When a design component as a sample is edited by the user in this way, a new design component is created. As a result, a document with a design that is based on the template is created.

Figure 2:
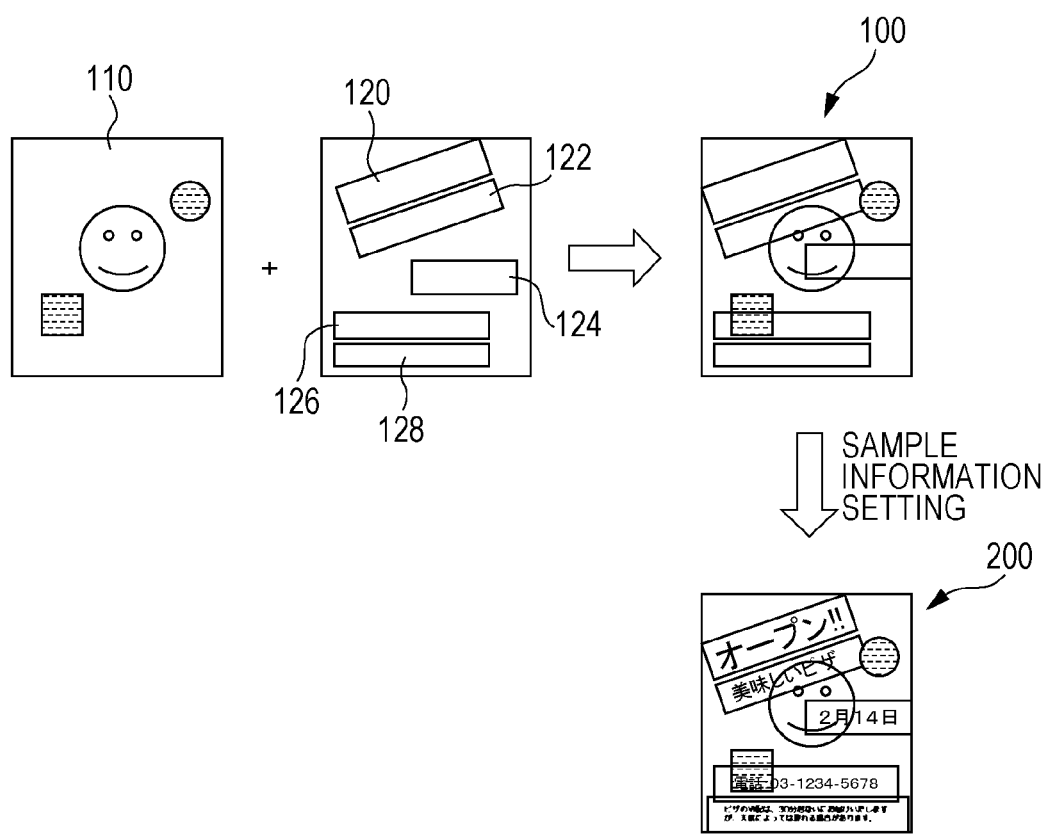
FIG. 2 illustrates a configuration of a template.

FIG. 2 illustrates an example of a template. A template 100 includes, for example, an image component 110 (image data) that is prohibited from editing by the user, and character string regions 120 to 128 that are permitted for editing by the user. In the example illustrated in FIG. 2, the character string regions 120 to 128 correspond to character components. Character strings are entered in the character string regions 120 to 128. For example, sample character strings are entered in the character string regions 120 to 128 in advance, and a template 200 with these sample character string entered is stored in the template DB 20. The user edits the character strings in the character string regions 120 to 128 to create a document with a design that is based on the template 200.

Figure 3:
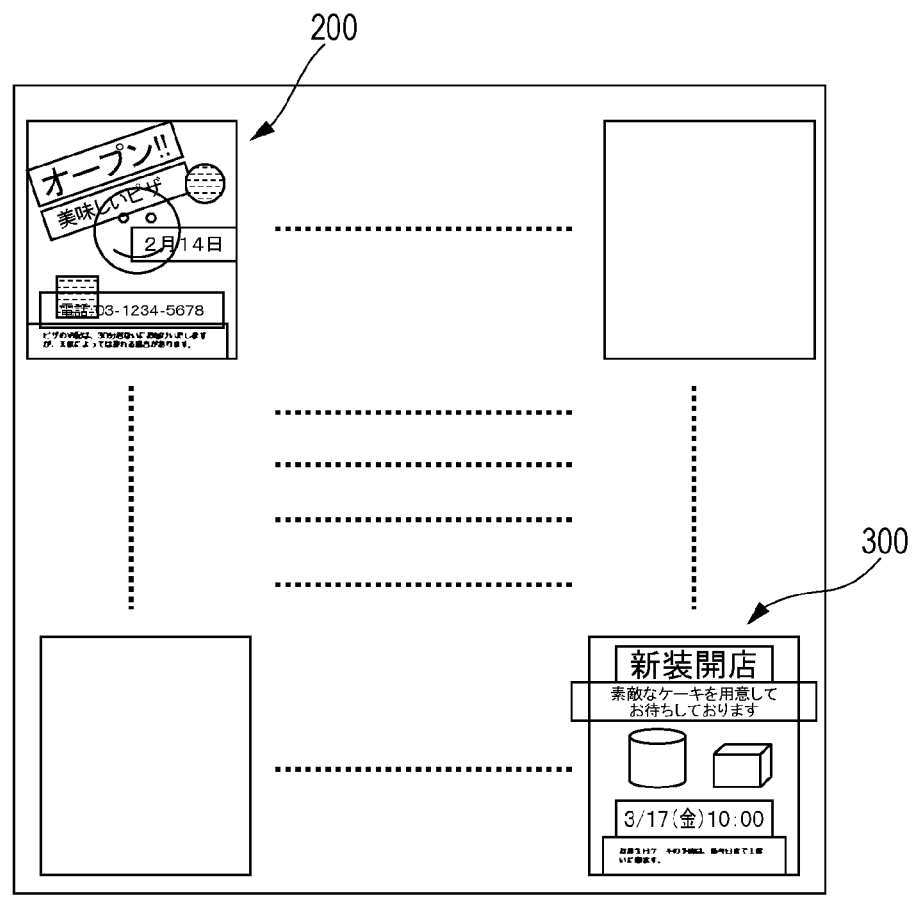
FIG. 3 illustrates a screen on which multiple templates are displayed.

FIG. 3 illustrates a display example of a template. For example, when the user logs in to the template management apparatus 10 by using the user terminal apparatus 72, the template manager 16 causes the user terminal apparatus 72 to display thumbnail images of multiple templates. Specifically, the template manager 16 transmits thumbnail images and display information used for displaying the thumbnail images to the user terminal apparatus 72 via the communication unit 12. On the user terminal apparatus 72, in accordance with the display information, the thumbnail images are displayed on its display. For example, thumbnail images of templates 200 to 300 are displayed on the display of the user terminal apparatus 72.

For example, when the user uses the operating unit of the user terminal apparatus 72 to specify a specific template from among the templates 200 to 300, and gives a display instruction that instructs the specific template to be displayed, the template identification information of the specified template, and information indicating the display instruction are transmitted from the user terminal apparatus 72 to the template management apparatus 10. In accordance with the display instruction, the template manager 16 causes the display of the user terminal apparatus 72 to display the specified template in enlarged view. For example, when the thumbnail image of the template 200 is specified by the user, the template 200 is displayed on the display of the user terminal apparatus 72 in enlarged view. Further, when the user uses the operating unit of the user terminal apparatus 72 to select a template to be edited, and gives an instruction to edit the template, the template to be edited is displayed on the display of the user terminal apparatus 72, thus permitting the template to be edited by the user.

FIG. 4 illustrates an example of a template management table. For example, this template management table is created by the template manager 16 and stored into the template DB 20. In the template management table, for example, template ID, sample information ID, sample character string, and thumbnail ID are associated with each other. A template ID is an example of template identification information for identifying each individual template. A sample information ID is an example of sample identification information for identifying each individual piece of sample information (sample character string). Further, a sample information ID may indicate the position of a sample character string in each individual template. A sample character string is, for example, information created by the provider by using the provider terminal apparatus 70. A thumbnail ID is, for example, created by the thumbnail creator 18. This thumbnail ID is used to identify a thumbnail image stored in the template DB 20.

FIG. 5 illustrates an example of a standard format word dictionary. This standard format word dictionary is stored in the standard format word DB 30. In the standard format word dictionary, for example, standard format word ID, attribute (type), and representation format are associated with each other. A standard format word ID is an example of standard format word identification information for identifying a standard format character string. An attribute (type) represents the attribute (type) of a standard format word, for example, telephone number, address, or day-moth-year date. A representation format is the representation format of a standard format sample character string included in a template. For example, a sample character string whose attribute is telephone number is generally represented in a template in a representation format such as "nnn-nnnn-nnnn" or "nn-nnnn-nnnn". A sample character string whose attribute is address is generally represented in a template in the form of a character string including a prefecture, a municipality, or a postal code number such as "東京都xxxxxx" (Tokyo xxxxxx). A sample character string whose attribute is year-month-day date is generally represented in a template in a representation format indicating a year-month-day date, such as "yyyy/mm/dd".

Now, referring to FIG. 5, the details of processing by the standard format determining unit 26 will be described. The standard format determining unit 26 identifies, from among multiple representation formats defined in the standard format word dictionary, a representation format that matches the representation format of a sample character string included in a template, and identifies an attribute corresponding to the identified representation format. If a representation format that matches the representation format of a sample character string exists among multiple representation formats defined in the standard format word dictionary, the sample character string is classified as a standard format character string. If a representation format that matches the representation format of a sample character string does not exist among multiple representation formats defined in the standard format word dictionary, the sample character string is classified as a non-standard format character string. For example, a sample character string "080-0000-0000" matches the representation format of telephone number. Therefore, the sample character string "080-0000-0000" is classified as a standard format character string, and its attribute is telephone number. In this way, each sample character string included in each template is classified as either a standard format character string or a non-standard format character string. For a sample character string classified as a standard format character string, the attribute of the character string is also identified. Attribute information indicating an attribute is associated with a sample character string classified as a standard format character string.

Figure 6:
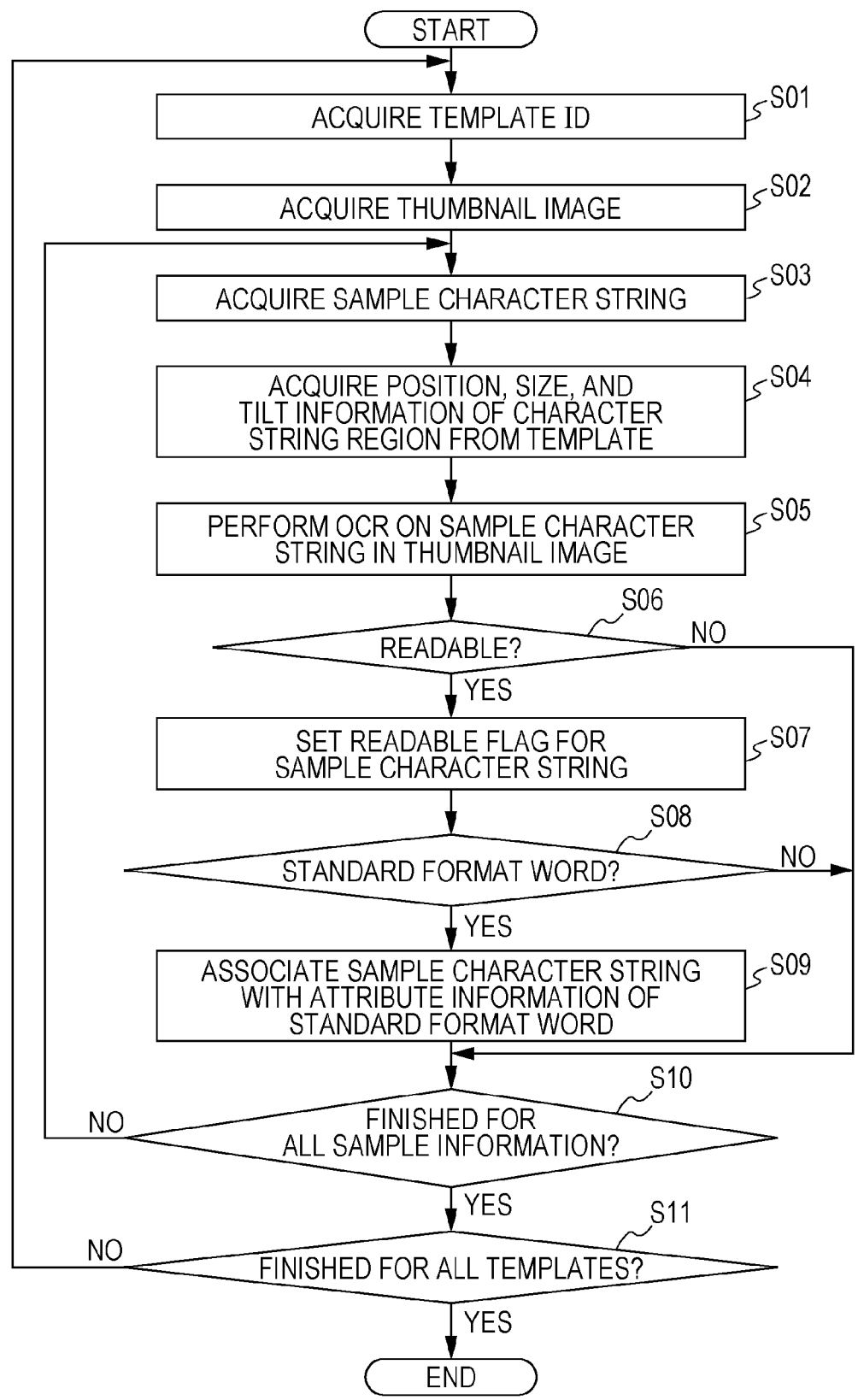
FIG. 6 is a flowchart illustrating a readability determination process and a standard format determination process.

Next, the details of processing by the standard format determining unit 26 and the readability determining unit 28 will be described with reference to the flowchart of FIG. 6.

First, the template information extracting unit 22 acquires a single template ID from the template DB 20 (S01). In the example illustrated in FIG. 4, the template information extracting unit 22 extracts a template ID "1021". The template information extracting unit 22 identifies a thumbnail ID associated with the template ID, and acquires a thumbnail image associated with the thumbnail ID from the template DB 20 (S02). Further, the template information extracting unit 22 acquires a sample character string associated with the template ID from the template DB 20 (S03). For example, the template information extracting unit 22 acquires a sample character string whose sample information ID is "1", from among multiple sample character strings associated with the template ID "1021". At this time, the template information extracting unit 22 acquires the following pieces of information from the template: information indicating the position of a character string region in which the sample character string is entered, information indicating the size of the character string region, and information indicating the tilt of the character string region (S04). The pieces of information acquired by the template information extracting unit 22 are output to the determining unit 24.

The readability determining unit 28 performs OCR on the above-mentioned sample character string in the thumbnail image (S05). For example, the readability determining unit 28 performs OCR on a sample character string corresponding to the template ID "1021" and whose sample information ID is "1". If this sample character string is recognized as a character string by OCR, that is, if it is determined that the sample character string is readable (S06: Yes), the readability determining unit 28 sets a Readable flag for the sample character string (S07). If this sample character string is not recognized as a character string by OCR, that is, if it is determined that the sample character string is unreadable (S06: No), the processing proceeds to step S10. Alternatively, if the font size (for example, the font size prior to creation of a thumbnail image) of a sample character string is larger than or equal to a reference font size, the readability determining unit 28 may set a Readable flag for this sample character string.

The standard format determining unit 26 references the standard format word dictionary illustrated in FIG. 5 to determine whether a sample character string determined to be readable (readable character string) is a standard format character string. If the sample character string corresponds to a standard format character string (S08: Yes), the standard format determining unit 26 associates this sample character string with attribute information indicating the attribute (type) of the standard format character string (S09). This sample character string corresponds to a readable standard format character string. If the sample character string does not correspond to a standard format character string (S08: No), the processing proceeds to step S10. This sample character string corresponds to a readable non-standard format character string. If any sample character string whose readability has not been determined yet exists in the template of interest (S10: No), the processing returns to step S03, and a readability determination process and a standard format determination process are executed for another sample character string. In the example illustrated in FIG. 4, a readability determination process and a standard format determination process are executed for a sample character string whose sample information ID is "2". Then, when the readability determination process has been executed for all of the sample character strings included in the template of interest (S10: Yes), the processing transfers to step S11. If any template for which the process from steps S01 to S10 has not been executed yet is stored in the template DB 20, the processing returns to step S01, and the process from steps S01 to S10 is executed for that template. In the example illustrated in FIG. 4, the process from steps S01 to S10 is executed for a template whose template ID is "1022". Then, when the process from steps S01 to S10 has been executed for all templates (S11: Yes), the processing by the standard format determining unit 26 and the readability determining unit 28 ends. In this regard, the standard format determination process may be executed before the readability determination process, or both the processes may be executed in parallel.

Figure 7:
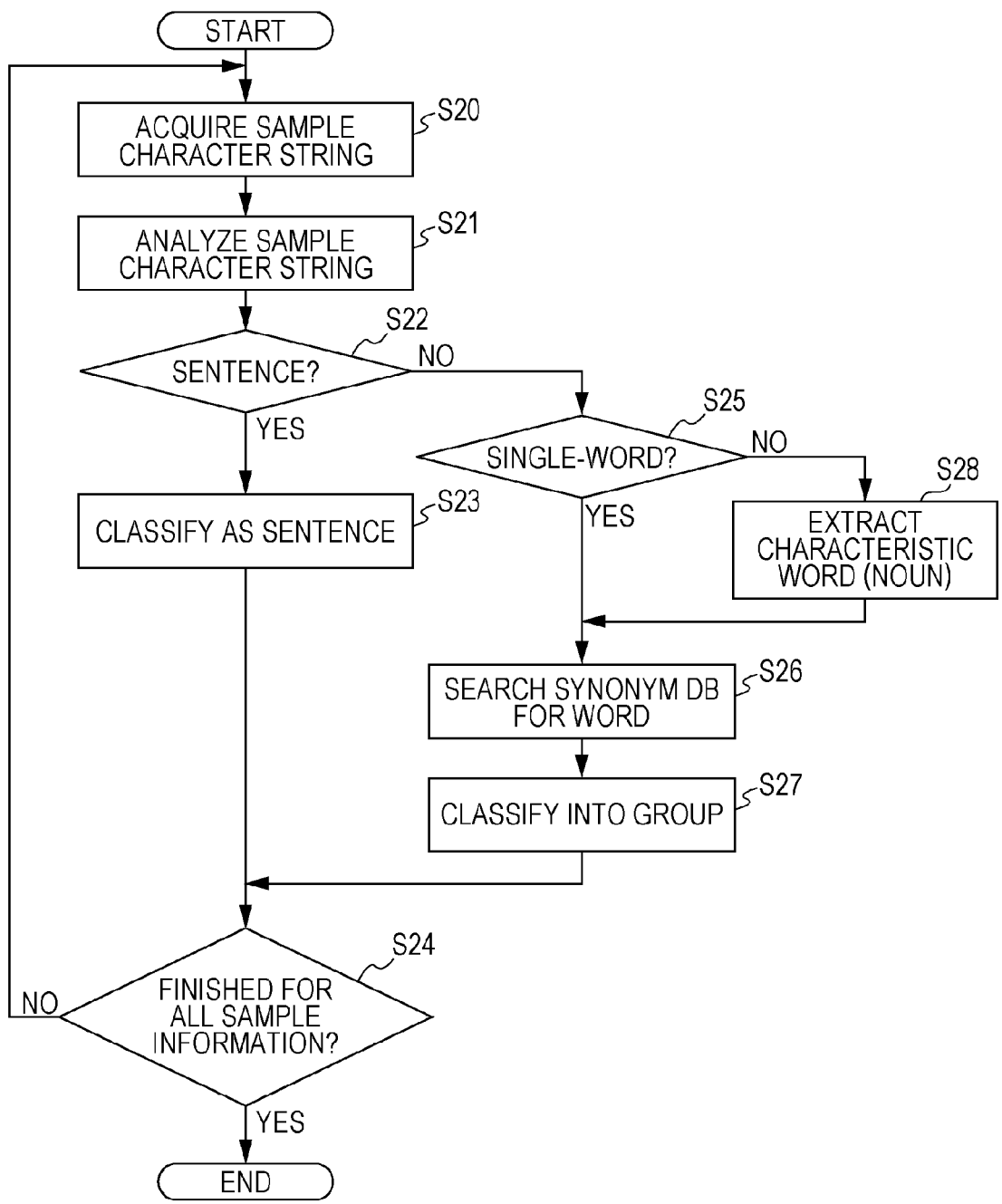
FIG. 7 is a flowchart illustrating processing executed to classify sample character strings into groups.

Next, the details of processing by the non-standard format group classifying unit 32 will be described with reference to FIG. 7.

First, the non-standard format group classifying unit 32 acquires a sample character string (readable non-standard format character string) from the determining unit 24 (S20). For example, the non-standard format group classifying unit 32 applies language analysis such as morphological analysis to the readable non-standard format character string (S21). If the readable non-standard format character string is recognized as a sentence by this analysis (S22: Yes), the non-standard format group classifying unit 32 classifies the readable non-standard format character string as a sentence (S23). If there is any readable non-standard format character string that has not undergone processing by the non-standard format group classifying unit 32 (S24: No), the processing returns to step S20, and the processing is executed for another readable non-standard format character string. If the readable non-standard format character string is not recognized as a sentence (S22: No), the non-standard format group classifying unit 32 determines whether the readable non-standard format character string is a single-word. If the readable non-standard format character string corresponds to a single-word (S25: Yes), the non-standard format group classifying unit 32 searches the synonym dictionary stored in the synonym DB 34 for a synonym of the readable non-standard format character string (S26), and classifies the readable non-standard format character string into a group (non-standard format character string group) to which the found synonym belongs (S27). If the readable non-standard format character string does not correspond to a single-word (S25: No), the non-standard format group classifying unit 32 extracts a characteristic word (for example, a noun) from the readable non-standard format character string (S28). Then, the non-standard format group classifying unit 32 searches the synonym dictionary for a synonym of the characteristic word (S26), and classifies the readable non-standard format character string having the characteristic word into a group (non-standard format character string group) to which the found synonym belongs (S27). In this way, a readable non-standard format character string is classified into a non-standard format character string group that is a set of character strings with identical meanings as the readable non-standard format character string. The non-standard format group classifying unit 32 executes the process from steps S20 to S28 for each readable non-standard format character string in each template. As a result, each readable non-standard format character string in each template is classified into a non-standard format character string group as a set of character strings that are identical to each other in meaning, or into a sentence.

As described above with reference to FIG. 6, a readable standard format character string is associated with attribute information indicating the attribute (type) of the readable standard format character string. The standard format group classifying unit 36 classifies readable standard format character strings associated with the same attribute information into the same standard format character string group. In this way, readable standard format character strings having the same attribute are classified into the same standard format character string group. The standard format group classifying unit 36 classifies each readable standard format character string in each template into a standard format character string group that is a set of character strings having the same attribute.

Figure 8:
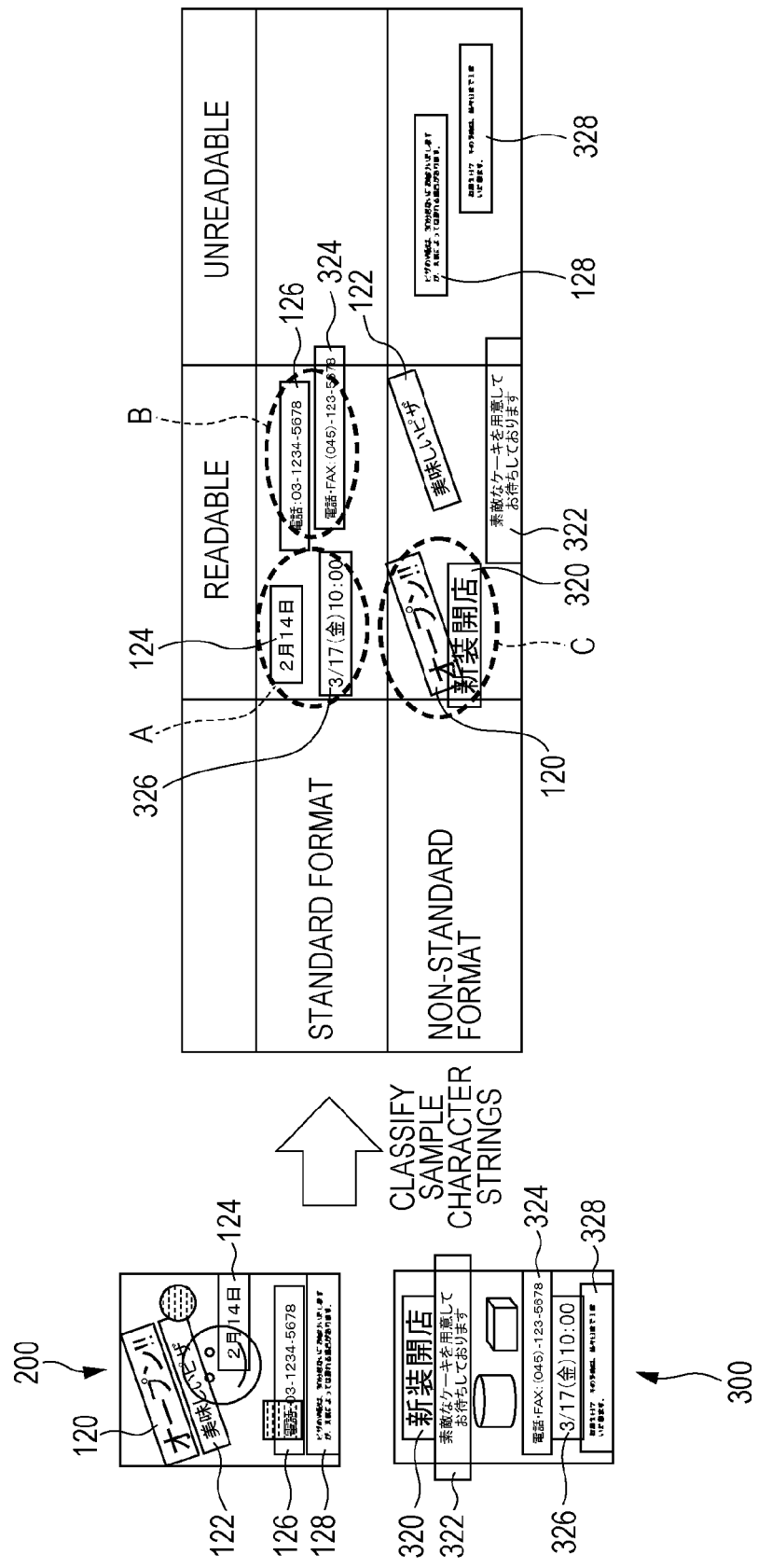
FIG. 8 explains processing executed by the template management apparatus in detail.

Next, the details of processing by the standard format determining unit 26, the readability determining unit 28, the non-standard format group classifying unit 32, and the standard format group classifying unit 36 will be descried by way of a specific example illustrated in FIG. 8. While the following description will be directed to the case of executing processing for the two templates 200 and 300, the number of templates is not limited to this. It suffices as long as at least one template is subject to processing.

The character string regions 120 to 128 are included in the template 200 in advance. Character string regions 320 to 328 are included in the template 300 in advance. Each of the character string regions 120 to 128 and 320 to 328 has, for example, a rectangular shape. This shape is only illustrative, and the shape of each character string region may be circular or elliptical. Further, the respective sizes (areas) of the character string regions 120 to 128 and 320 to 328 are determined in advance. A sample character string is entered in each of the character string regions 120 to 128 and 320 to 328 in advance. The font size and font type of each sample character string are determined in advance. Within the same character string region, each character in a sample character string may have the same font size or may have a different font size. The templates 200 and 300 in which sample character strings are entered, a thumbnail image of the template 200, and a thumbnail image of the template 300 are stored in the template DB 20.

The standard format determining unit 26 references the standard format word dictionary illustrated in FIG. 5 to classify each of sample character strings entered in the character string regions 120 to 128 and 320 to 328, as either a standard format character string or a non-standard format character string.

For example, each of the sample character string "2月14日" (February 14) in the character string region 124, the sample character string "電話: 03-1234-5678" (Telephone: 03-1234-5678) in the character string region 126, the sample character string "電話•FAX: (045)-123-567" (Telephone/Fax: (045)-123-5678) in the character string region 324, and the sample character string "3/17 (金) 10:00" (3/17 (Fri) 10:00) in the character string region 326 is represented in a representation format defined in the standard format word dictionary, and hence classified as a standard format character string. The attribute of the sample character strings in the respective character string regions 124 and 326 is "year-month-day date", and the attribute of the sample character strings in the respective character string regions 126 and 324 is "telephone number". These attributes are also determined by the standard format determining unit 26.

Each of the sample character string "オープン！！" (Opening!!) in the character string region 120, the sample character string "美味しいピザ" (delicious pizza) in the character string region 122, the sample character string in the character string region 128, the sample character string "新装開店" (Remodel Opening) in the character string region 320, the sample character string "素敵なケーキを用意してお待ちしております" (We look forward to your visit with wonderful cakes) in the character string region 322, and the sample character string " . . . " in the character string region 328 is not represented in a representation format defined in the standard format word dictionary, and hence classified as a non-standard format character string.

The readability determining unit 28 classifies each of sample character strings in the character string regions 120 to 128 and 320 to 328 as a readable character string or a non-readable character string. For example, the readability determining unit 28 performs OCR on each of the thumbnail images of the templates 200 and 300, and classifies a sample character string as a readable character string if the sample character string is recognized as a character string. The readability determining unit 28 may classify a sample character string as a readable character string if the sample character string has a character count larger than or equal to a predetermined threshold. Alternatively, among sample character strings in the character string regions 120 to 128 and 320 to 328, the readability determining unit 28 may classify a sample character string as a readable character string if the sample character string has a font size larger than or equal to a reference font size. The readability determining unit 28 may classify a sample character string as a readable character string if the number of characters having a font size larger than or equal to a reference font size in the sample character string is larger than or equal to a predetermined threshold.

For example, each of the sample character strings in the character string regions 120, 122, 124, 126, 320, 322, 324, and 326 is classified as a readable character string, and each of the sample character strings in the character string regions 128 and 328 is classified as an unreadable character string.

As described above, as a result of the processing by the standard format determining unit 26 and the readability determining unit 28, each of the sample character strings in the character string regions 124, 126, 324, and 326 is classified as a readable standard format character string, each of the sample character strings in the character string regions 120, 122, 320, and 322 is classified as a readable non-standard format character string, and each of the sample character strings in the character string regions 128 and 328 is classified as an unreadable non-standard format character string.

The attribute of the sample character strings in the respective character string regions 124 and 326 is "year-month-day date". Accordingly, these sample character strings are associated with attribute information indicating "year-month-day date" by the standard format determining unit 26. Then, the sample character strings in the respective character string regions 124 and 326 are classified into the same standard format character string group A (a group whose attribute is "year-month-day date") by the standard format group classifying unit 36.

The attribute of the sample character strings in the respective character string regions 126 and 324 is "telephone number". Accordingly, these sample character strings are associated with attribute information indicating "telephone number" by the standard format determining unit 26. Then, the sample character strings in the character string regions 126 and 324 are classified into the same standard format character string group B (a group whose attribute is "telephone number") by the standard format group classifying unit 36.

The sample character string in the character string region 120 is "オープン！！" (Opening!!), and the sample character string in the character string region 320 is "新装開店" (Remodel Opening). Therefore, these sample character strings have identical meanings and are synonymous to each other. Accordingly, the sample character strings in the character string regions 120 and 320 are classified into the same non-standard format character string group C by the non-standard format group classifying unit 32.

The sample character string in the character string region 122 does not correspond to a single-word, and this sample character string is classified into a non-standard format character string group according to the characteristic word (for example, the noun "ピザ" (pizza)) in the sample character string. The sample character string in the character string region 322 is a sentence, and hence not classified into any group. The sample character strings in the character string regions 128 and 328 are unreadable, and hence not classified into any group.

The standard format group classifying unit 36 associates each of the standard format character string groups A and B with group identification information (for example, group ID) for identifying the group. Likewise, the non-standard format group classifying unit 32 associates the non-standard format character string group C with group identification information (for example, group ID) for identifying the group.

In this way, multiple sample character strings included in the templates 200 and 300 are each classified as one of a readable standard format character string, a readable non-standard format character string, an unreadable standard format character string, and an unreadable non-standard format character string. Further, a readable standard format character string is classified into a standard format character string group that is a set of character strings with the same attribute, and a readable non-standard format character string is classified into a non-standard format character string group that is a set of character strings with identical meanings. In the example illustrated in FIG. 8, the standard format character string groups A and B, and the non-standard format character string group C are created. While a single non-standard format character string group C is created in this example, if there are multiple readable non-standard format character strings that differ in meaning, multiple non-standard format character string groups are to be created. If there is no readable standard format character string, no standard format character string group is created, and if there is no readable non-standard format character string, no non-standard format character string group is created.

While the two templates 200 and 300 are subject to processing in the example illustrated in FIG. 8, three or more templates may be subject to processing. In this case as well, through the same processing as mentioned above, multiple sample character strings included in multiple templates are each classified as one of a readable standard format character string, a readable non-standard format character string, an unreadable standard format character string, and an unreadable non-standard format character string. Further, a readable standard format character string is classified into a standard format character string group, and a readable non-standard format character string is classified into a non-standard format character string group.

When at least one readable standard format character string is classified into at least one standard format character string group in this way, a replacement standard format character string candidate is associated with each standard format character string group. Likewise, when at least one readable non-standard format character string is classified into at least one non-standard format character string group, a replacement non-standard format character string candidate is associated with each non-standard format character string group. For example, a replacement non-standard format character string candidate is entered by the provider of a template, and a replacement standard format character string candidate is stored on the template management apparatus 10 in advance. In this regard, a replacement standard format character string candidate may be also entered by the provider.

Next, a process for setting a replacement character string candidate will be described. The following description will be directed to a process for setting a replacement non-standard format character string candidate for a non-standard format character string group. First, when a non-standard format character string group is created, the group ID of the non-standard format character string group is displayed on the display of the provider terminal apparatus 70. For example, the template manager 16 transmits the group ID of the non-standard format character string group and display information used for displaying the group ID to the provider terminal apparatus 70 via the communication unit 12, and causes the display of the provider terminal apparatus 70 to display the group ID. For example, a list of multiple group IDs is displayed on the display of the provider terminal apparatus 70. Then, when the provider uses the operating unit of the provider terminal apparatus 70 to specify a non-standard format character string group to be replaced, the group ID of the specified non-standard format character string group is transmitted from the provider terminal apparatus 70 to the template management apparatus 10. For example, the provider may specify, from among multiple group IDs, the group ID of the non-standard format character string group to be replaced. The template manager 16 transmits entry screen information, which is used for entering a replacement character string candidate for the specified non-standard format character string group, to the provider terminal apparatus 70 via the communication unit 12, and causes the display of the provider terminal apparatus 70 to display an entry screen. At this time, the template manager 16 may cause the display of the provider terminal apparatus 70 to display readable non-standard format character strings (sample character strings) belonging to the specified non-standard format character string group.

FIG. 9 illustrates an example of a screen used for entering replacement non-standard format character string candidates. The entry screen illustrated in FIG. 9 is, for example, a screen for setting replacement non-standard format character string candidates for the non-standard format character string group C. Sample character strings "新装開店" (Remodel Opening) and "オープン！！" (Opening!!) classified into the non-standard format character string group C are displayed on this entry screen. Each of these sample character strings corresponds to a readable non-standard format character string. Further, the entry screen includes entry fields for entering replacement non-standard format character string candidates (for example, Candidates 1 to 5). A replacement non-standard format character string candidate is entered into each of these entry fields by the provider. For example, a replacement non-standard format character string candidate represented in a language (for example, English) different from the sample character string is entered. Specifically, for example, the sample character strings in this case are "新装開店" (Remodel Opening) and "オープン！！" (Opening!!). Accordingly, character strings such as "Opening", "New Opening", "Grand Opening", and "Remodel Opening" are entered as replacement non-standard format character string candidates. These character strings are only illustrative, and the actual replacement non-standard format character string candidates may be determined by the provider. For a non-standard format character string group other than the non-standard format character string group C as well, the provider may enter replacement non-standard format character string candidates for the non-standard format character string group. If a replacement non-standard format character string candidate represented in the same language (for example, Japanese) as the sample character string (readable non-standard format character string) is entered, the candidate is translated into another language (for example, English) by the translator 42.

Information indicating a replacement non-standard format character string candidate entered as mentioned above is transmitted from the provider terminal apparatus 70 to the template management apparatus 10. Then, the non-standard-format-group-associated word manager 40 associates a non-standard format character string group with a replacement non-standard format character string candidate entered for the non-standard format character string group. In the above-mentioned example, the non-standard format character string group C is associated with each of replacement non-standard format character string candidates such as "Opening", "New Opening", "Grand Opening", and "Remodel Opening". When a replacement non-standard format character string candidate is translated by the translator 42, the translated candidate and the corresponding non-standard format character string group are associated with each other.

Replacement standard format character string candidates are stored on the template management apparatus 10 in advance. For example, a replacement standard format character string candidate for a standard format character string group of telephone number is a character string represented in the format for telephone number (for example, "XXX-XXXX-XXXX"). A replacement standard format character string candidate for a standard format character string group of address is a character string represented in the format for address. A replacement standard format character string candidate for a standard format character string group of year-month-day date is a character string represented in the format for year-month-day date (for example, "yyyy/mm/dd"). A replacement standard format character string candidate for telephone number or year-month-day date is basically represented by numeric characters. A replacement standard format character string candidate for address is, for example, a character string represented in a language (for example, English) different from the corresponding readable standard format character string. Because a readable standard format character string is a character string in a standard format, when a replacement candidate corresponding to each attribute is prepared in advance, it is unnecessary for the provider to enter a replacement candidate corresponding to the readable standard format character string. Multiple replacement standard format character string candidates may be stored on the template management apparatus 10 in advance for each attribute. The standard-format-group-associated word manager 44 associates a standard format character string group with at least one replacement standard format character string candidate for the standard format character string group. Like a replacement non-standard format character string candidate, a replacement standard format character string candidate may be entered by the provider by using an entry screen.

Figure 10:
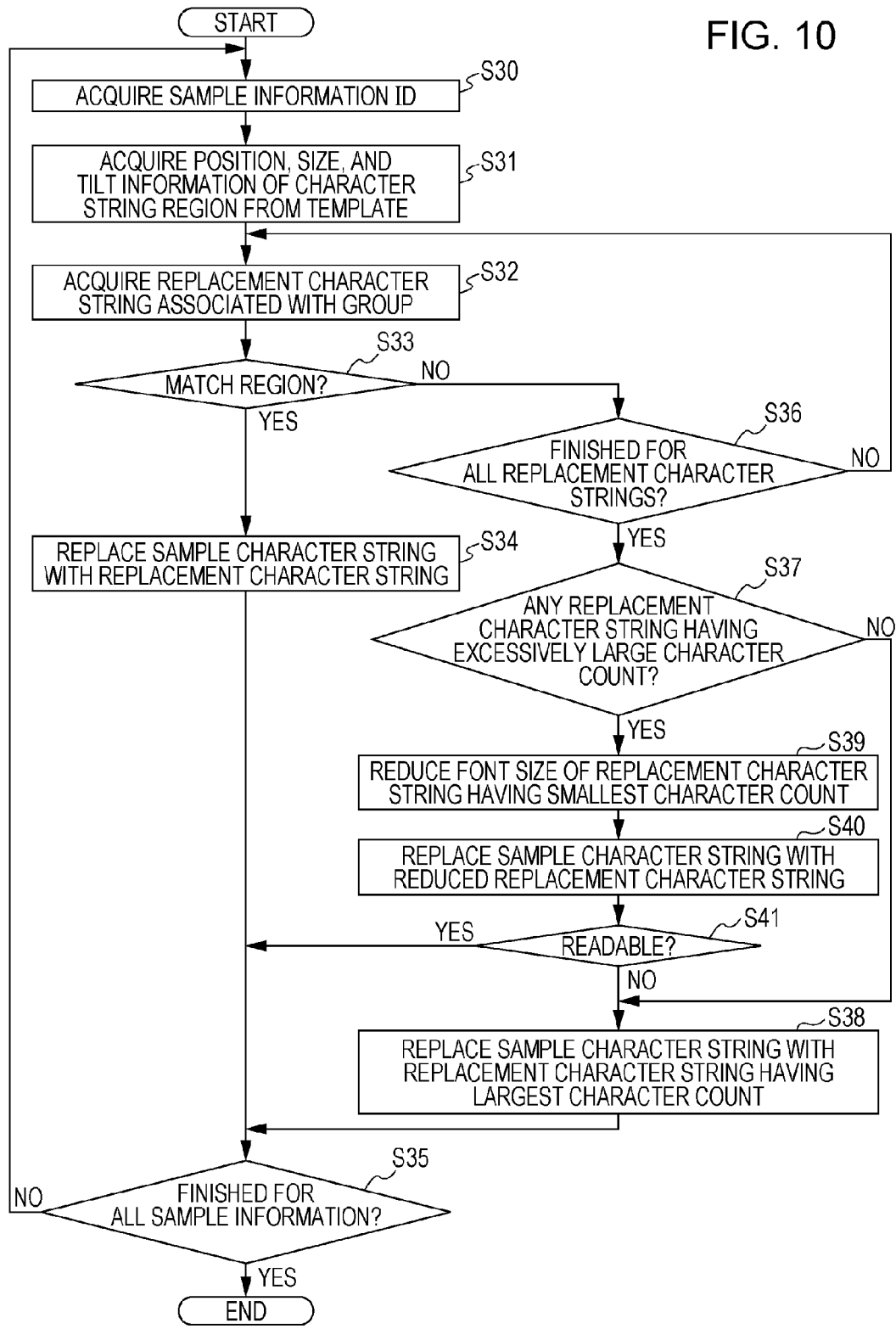
FIG. 10 is a flowchart illustrating a replacement of a sample character string.

Next, a replacement performed by the associated-word selecting unit 46 and the sample information replacing unit 48 will be described in detail with reference to the flowchart illustrated in FIG. 10. The following description will be directed to the case of performing a replacement for the templates 200 and 300 illustrated in FIG. 8.

First, the sample information ID of a sample character string included in the template of interest is acquired from the template DB 20 (S30). For example, the associated-word selecting unit 46 acquires the sample information ID of the sample character string "オープン！！" (Opening!!) entered in the character string region 120 included in the template 200. This sample character string "オープン！！" (Opening!!) is a readable non-standard format character string. The associated-word selecting unit 46 also acquires the following piece of information from the template 200: information indicating the position of the character string region 120 in the template 200, information indicating the size of the character string region 120, and information indicating the tilt of the character string region 120 (S31).

Then, the associated-word selecting unit 46 acquires, from the non-standard-format-group-associated word manager 40, a replacement non-standard format character string candidate associated with the readable non-standard format character string group C to which the sample character string "オープン！！" (Opening!!) belongs (S32). In the example illustrated in FIG. 8, the sample character string "オープン！！" (Opening!!) is classified into the readable non-standard format character string group C, and character strings such as "Opening", "New Opening", "Grand Opening", and "Remodel Opening" are associated with the readable non-standard format character string group C as replacement non-standard format character string candidates. The associated-word selecting unit 46 selects one candidate from among those candidates. For example, if multiple candidates are entered while being ranked as Candidates 1 to 5, the associated-word selecting unit 46 selects a candidate according to this ranking. For example, suppose that the associated-word selecting unit 46 has selected Candidate 1 "Opening".

Next, the associated-word selecting unit 46 determines whether Candidate 1 "Opening" matches the character string region 120. Hereinafter, this determination process will be referred to as "matching process". For example, the associated-word selecting unit 46 sets the font size of Candidate 1 "Opening" to the same as the front size of the sample character string "オープン！！" (Opening!!) originally entered in the character string region 120, and then enters Candidate 1 "Opening" into the character string region 120. At this time, if a predetermined proportion (for example, 90% to 100%) of the total width of the character string region 120 is occupied by Candidate 1 "Opening", it is determined that Candidate 1 "Opening" matches the character string region 120 (S33: Yes). If the above-mentioned proportion exceeds 100%, that is, if the character count of Candidate 1 "Opening" is so large in relation to the character string region 120 that the character string of Candidate 1 "Opening" does not fit in the character string region 120 and extends beyond the character string region 120, it is determined that Candidate 1 "Opening" does not match the character string region 120 (S33: No). If the above-mentioned proportion is less than 90%, that is, if the character count of Candidate 1 "Opening" is too small in relation to the character string region 120, it is determined that Candidate 1 "Opening" does not match the character string region 120 (S33: No). That is, if the character string length of Candidate 1 "Opening" falls within the range of 90% to 100% of the width of the character string region 120, it is determined that Candidate 1 "Opening" matches the character string region 120. A candidate determined to match a character string region is adopted as a replacement non-standard format character string. The above-mentioned portion (90% to 100%) is only illustrative. For example, this proportion may be changed by the provider.

If Candidate 1 "Opening" matches the character string region 120 (S33: Yes), the sample information replacing unit 48 replaces the sample character string "オープン！！" (Opening!!) entered in the character string region 120, with Candidate 1 "Opening" (S34). As a result, the sample character string in the character string region 120 is replaced with a character string (replacement non-standard format character string) represented in English.

If there is any sample character string that has not been replaced yet among all sample character strings belonging to standard format character string groups and all sample character strings belonging to non-standard format character string groups in the template 200 (S35: No), the processing returns to step S30, and a replacement is performed on the sample character string that has not been replaced yet.

If Candidate 1 "Opening" does not match the character string region 120 (S33: No), the processing transfers to step S36. If the matching process in step S33 has been executed for all replacement non-standard format character string candidates (for example, Candidate 1 to 5) associated with the non-standard format character string group C (S36: Yes), the processing transfers to step S37. If any candidate for which the matching process in step S33 has not been executed yet exists among all the replacement non-standard format character string candidates (for example, Candidate 1 to 5) associated with the non-standard format character string group C (S36: No), the processing transfers to step S32. In this case, the associated-word selecting unit 46 acquires the next ranked candidate (for example, Candidate 2 ("New Opening") from among the replacement non-standard format character string candidates (for example, Candidate 1 to 5) associated with the non-standard format character string group C (S32), and executes a matching process (S33). Then, if Candidate 2 ("New Opening") matches the character string region 120 (S33: Yes), the sample information replacing unit 48 replaces the sample character string "オープン！！" (Opening!!) in the character string region 120 with Candidate 2 ("New Opening") (S34). If Candidate 2 ("New Opening") does not match the character string region 120 (S33: No), the processing transfers to step S36. Then, if there is no candidate that matches the character string region 120 among Candidates 1 to 5, that is, if the matching process has been already executed for all the candidates (S36: Yes), the processing transfers to step S37.

Then, if, among all the replacement non-standard format character string candidates (Candidates 1 to 5) associated with the non-standard format character string group C, there is no candidate whose character count is too large in relation to the character string region 120, that is, if there is no character string candidate whose proportion exceeds 100% and which thus extends beyond the character string region 120 (S37: No), the processing transfers to step S38. In this case, the character counts of all the replacement non-standard format character string candidates are too small (less than 90% in proportion) in relation to the character string region 120. In step S38, from a group of candidates whose character counts are too small in relation to the character string region 120 among Candidates 1 to 5, the associated-word selecting unit 46 selects a candidate with the largest character count. The sample information replacing unit 48 replaces the sample character string "オープン！！" (Opening!!) in the character string region 120 with the selected candidate. Then, the processing transfers to step S35. Through the process in step S38, a sample character string is replaced with a character string that does not extend beyond the character string region 120 and has, among Candidates 1 to 5, a size closest to the size of the pre-replacement sample character string. This minimizes a change in the impression of the size of the sample character string before and after the replacement.

If, among all the replacement non-standard format character string candidates (Candidates 1 to 5) associated with the non-standard format character string group C, there is any candidate whose character count is too large in relation to the character string region 120, that is, if there is any character string candidate whose proportion exceeds 100% and which thus extends beyond the character string region 120 (S37: Yes), the processing transfers to step S39. In step S39, from a group of candidates whose character counts are too small in relation to the character string region 120 among Candidates 1 to 5, the associated-word selecting unit 46 selects a candidate with the smallest character count (for example, Candidate 1 "Opening"), and the sample information replacing unit 48 reduces the font size of Candidate 1 "Opening" selected in this way. At this time, the sample information replacing unit 48 reduces the font size of Candidate 1 "Opening" to a size that makes Candidate 1 "Opening" match the character string region 120. For example, the sample information replacing unit 48 reduces the font size of Candidate 1 "Opening" so that the proportion of Candidate 1 "Opening" to the width of the character string region 120 becomes 90% to 100%. Then, the sample information replacing unit 48 replaces the sample character string "オープン！！" (Opening!!) in the character string region 120 with Candidate 1 "Opening" with the reduced font size (S40). Through the process in steps S39 and S40, a sample character string is replaced with a character string that does not extend beyond the character string region 120 and has, among Candidates 1 to 5, a size closest to the size of the pre-replacement sample character string. This minimizes a change in the impression of the size of the sample character string before and after the replacement.

Then, it is determined whether Candidate 1 "Opening" with the reduced font size is readable (S41). This readability determination is executed by the readability determining unit 28. As described above, readability is determined by using OCR. Alternatively, readability is determined by comparison between the reduced font size of Candidate 1 and a reference font size value. If Candidate 1 is determined to be readable (S41: Yes), the processing transfers to step S35. If Candidate 1 is determined to be unreadable (S41: No), the processing transfers to step S38. In this case, the associated-word selecting unit 46 selects a candidate with the largest character count, from a group of candidates whose character counts are too small in relation to the character string region 120 among Candidates 1 to 5. The sample information replacing unit 48 replaces the sample character string "オープン！！" (Opening!!) in the character string region 120 with the selected candidate. Then, the processing transfers to step S35. Through the process in steps S41 and S38, a sample character string is replaced with a readable replacement non-standard format character string.

By repeatedly executing steps S30 to S41, a replacement is executed for all sample character strings belonging to standard format character string groups and all sample character strings belonging to non-standard format character string groups in the template 200.

While the above description is directed to the case of replacing a sample character string belonging to a non-standard format character string group, the process in steps S30 to S41 is executed also for a sample character string belonging to a standard format character string group. That is, the associated-word selecting unit 46 and the sample information replacing unit 48 execute the process in steps S30 to S41 mentioned above for a sample character string classified into a standard format character string group.

For example, when executing a replacement on the sample character string "2月14日" (February 14) in the character string region 124, the associated-word selecting unit 46 acquires, from the standard-format-group-associated word manager 44, a replacement standard format character string candidate (for example, a character string "2/14") associated with the readable standard format character string group A to which the sample character string "2月14日" (February 14) belongs. Then, if the replacement standard format character string candidate "2/14" matches the character string region 124, the sample information replacing unit 48 replaces the sample character string "2月14日" (February 14) entered in the character string region 124, with the candidate "2/14". As a result, the sample character string in the character string region 124 is replaced with a replacement standard format character string.

Then, when a replacement has been executed for all sample character strings belonging to standard format character string groups and all sample character strings belonging to non-standard format character string groups in the template 200 (S35: Yes), the replacement for the template 200 is finished. In this case, the process in steps S30 to S35 is executed for the template 300. When the replacement for each of the templates 200 and 300 is finished, the replacement according to the exemplary embodiment ends.

In some cases, there may exist a sample character string that is a readable non-standard format character string but is not classified into a readable non-standard format character string group. In the example illustrated in FIG. 8, the sample character string entered in the character string region 322 is not classified into a readable non-standard format character string group, and belongs to a sentence. In the exemplary embodiment, such a sample character string may or may not be replaced. If such a sample character string is to be replaced, the provider may enter a replacement non-standard format character string for the character string region 322. If such a sample character string is not to be replaced, the sample character string in the character string region 322 is to be represented in the original language (for example, Japanese) in the post-replacement template.

As described above, in the exemplary embodiment, a sample character string is classified into one of a readable standard format character string group and a readable non-standard format character string group, and the sample character string is replaced with a replacement character string associated with a group to which the sample character string belongs. For example, in the case of translating each sample character string included in multiple templates, according to the exemplary embodiment, each sample character string included in the multiple templates is classified into one of a readable standard format character string group and a readable non-standard format character string group, and each sample character string is replaced by a replacement character string associated with a group to which the sample character string itself belongs.

In the exemplary embodiment, a standard format character string is replaced with a replacement standard format character string whose representation format is identical or similar to that of the standard format character string. Therefore, for a standard format character string, its appearance before replacement is maintained, or a change in its appearance is minimized. Further, multiple non-standard format character strings that are synonymous to each other are classified into the same readable non-standard format character string group, and each of such non-standard format character strings is replaced with a replacement non-standard format character string associated with the readable non-standard format character string group. Therefore, multiple non-standard format character strings that are synonymous to each other are each replaced with an identical or synonymous replacement non-standard format character string. Since a sample character string only serves as a sample, the precise meaning of a sample character string may not be maintained before and after the replacement. That is, if a sample character string is a standard format character string, the sample character string may be replaced with a character string that is similar in appearance, and if a sample character string is a non-standard format character string, the sample character string may be replaced with a synonymous character string. Through such a replacement as well, the post-replacement character string serves as a sample character string.

Since an unreadable character string is a character string that may not be recognized by the user on the thumbnail image, a replacement is not executed for an unreadable character string.

The above description is directed to the case where a replacement character string is represented in English. However, a replacement character string may be represented in a language other than English (for example, Chinese, Korean, German, French, Italian, Portuguese, Spanish, or Russian). If a replacement character string represented in a language other than English is entered, the original sample character string is replaced by the replacement character string represented in a language other than English. Alternatively, the original sample character string may be represented in a language other than Japanese, and a replacement character string may be represented in Japanese. In this case, the original sample character string is replaced with the replacement character string represented in Japanese.

A post-replacement template may be either stored in the template DB 20 or output to an external apparatus. For example, a pre-replacement template (for example, a template represented in Japanese) and a post-replacement template (for example, a template represented in English) may be stored in the template DB 20. When the user specifies the language to be used on the user terminal apparatus 72, the template manager 16 may transmit a template represented in the specified language to be used to the user terminal apparatus 72.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A template management apparatus comprising:
at least one hardware processor configured to implement:
in response to reception of a template used to create a design and including a sample character string previously created as a sample, classifying the sample character string as one of a standard format character string and a non-standard format character string;
classifying the sample character string classified as the standard format character string into a standard format character string group according to a representation format of the sample character string, and classifies the sample character string classified as the non-standard format character string into a non-standard format character string group according to content of the sample character string; and
performing a replacement including
replacing the sample character string classified into the standard format character string group with a replacement standard format character string, the replacement standard format character string being associated with the standard format character string group and represented in a representation format corresponding to the sample character string, and
replacing the sample character string classified into the non-standard format character string group with a replacement non-standard format character string, the replacement non-standard format character string being associated with the non-standard format character string group and represented in a different language from the sample character string, wherein the sample character string is included in a character string region that is determined in advance in the template, and wherein the replacement further comprises selecting, as the replacement standard format character string, a replacement standard format character string candidate having a number of characters that match a size of the character string region of the sample character string classified as the standard format character string, from at least one replacement standard format character string candidate associated with the standard format character string group, and selecting, as the replacement non-standard format character string, a replacement non-standard format character string candidate having a number of characters that match a size of the character string region of the sample character string classified as the non-standard format character string, from at least one replacement non-standard format character string candidate associated with the non-standard format character string group, wherein if the at least one replacement standard format character string candidate does not include the replacement standard format character string candidate that matches the size of the character string region of the sample character string classified as the standard format character string, the replacement further comprises selecting, as the replacement standard format character string, a replacement standard format character string candidate whose number of characters is greater than a first threshold in relation to the size of the character string region of the sample character string classified as the standard format character string, from the at least one replacement standard format character string candidate, and reducing a size of the selected replacement standard format character string, wherein if the at least one replacement non-standard format character string candidate does not include the replacement non-standard format character string candidate that matches the size of the character string region of the sample character string classified as the non-standard format character string, the replacement further comprises selecting, as the replacement non-standard format character string, a replacement non-standard format character string candidate whose number of characters is greater than a second threshold in relation to the size of the character string region of the sample character string classified as the non-standard format character string, from the at least one replacement non-standard format character string candidate, and reducing a size of the selected replacement non-standard format character string, wherein if the replacement standard format character string that has been reduced in size is less than a third threshold, the replacement further comprises selecting, as the replacement standard format character string, a replacement standard format character string candidate having a largest number of characters, from at least one replacement standard format character string candidate whose number of characters is less than the third threshold in relation to the size of the character string region of the sample character string classified as the standard format character string, and wherein if the replacement non-standard format character string that has been reduced in size is less than a fourth threshold, the replacement further comprises selecting, as the replacement non-standard format character string, a replacement non-standard format character string candidate having a largest number of characters, from at least one replacement non-standard format character string candidate whose number of characters is less than the fourth threshold in relation to the size of the character string region of the sample character string classified as the non-standard format character string.

2. The template management apparatus according to claim 1, wherein the at least one hardware processor is further configured to perform the replacement for the sample character string in response to a determination that the sample character string comprises a font that is greater than a predetermined size.

3. The template management apparatus according to claim 2, wherein:

the sample character string is included in a character string region that is determined in advance in the template; and the replacement further comprises selecting, as the replacement standard format character string, a replacement standard format character string candidate having a number of characters that match a size of the character string region of the sample character string classified as the standard format character string, from at least one replacement standard format character string candidate associated with the standard format character string group, and selecting, as the replacement non-standard format character string, a replacement non-standard format character string candidate having a number of characters that match a size of the character string region of the sample character string classified as the non-standard format character string, from at least one replacement non-standard format character string candidate associated with the non-standard format character string group.

4. The template management apparatus according to claim 1, wherein:

if the at least one replacement standard format character string candidate does not include the replacement standard format character string candidate whose number of characters is greater than the first threshold, the replacement further comprises selecting, as the replacement standard format character string, a replacement standard format character string candidate having a largest number of characters, from at least one replacement standard format character string candidate whose number of characters is less than a third threshold in relation to the size of the character string region of the sample character string classified as the standard format character string; and if the at least one replacement non-standard format character string candidate does not include the replacement non-standard format character string candidate whose number of characters is greater than the second threshold, the replacement further comprises selecting, as the replacement non-standard format character string, a replacement non-standard format character string candidate having a largest number of characters, from at least one replacement non-standard format character string candidate whose number of characters is less than a fourth threshold in relation to the size of the character string region of the sample character string classified as the non-standard format character string.

5. A non-transitory computer readable medium storing a program causing a computer to execute a process for performing template management, the process comprising:
classifying, in response to reception of a template used to create a design and including a sample character string previously created as a sample, the sample character string as one of a standard format character string and a non-standard format character string;
classifying the sample character string classified as the standard format character string into a standard format character string group according to a representation format of the sample character string;
classifying the sample character string classified as the non-standard format character string into a non-standard format character string group according to content of the sample character string;
replacing the sample character string classified into the standard format character string group with a replacement standard format character string, the replacement standard format character string being associated with the standard format character string group and represented in a representation format corresponding to the sample character string; and
replacing the sample character string classified into the non-standard format character string group with a replacement non-standard format character string, the replacement non-standard format character string being associated with the non-standard format character string group and represented in a different language from the sample character string,
wherein the sample character string is included in a character string region that is determined in advance in the template, and
wherein replacing the sample character string further comprises
selecting, as the replacement standard format character string, a replacement standard format character string candidate having a number of characters that match a size of the character string region of the sample character string classified as the standard format character string, from at least one replacement standard format character string candidate associated with the standard format character string group, and
selecting, as the replacement non-standard format character string, a replacement non-standard format character string candidate having a number of characters that match a size of the character string region of the sample character string classified as the non-standard format character string, from at least one replacement non-standard format character string candidate associated with the non-standard format character string group,
wherein if the at least one replacement standard format character string candidate does not include the replacement standard format character string candidate that matches the size of the character string region of the sample character string classified as the standard format character string, replacing the sample character string further comprises selecting, as the replacement standard format character string, a replacement standard format character string candidate whose number of characters is greater than a first threshold in relation to the size of the character string region of the sample character string classified as the standard format character string, from the at least one replacement standard format character string candidate, and reducing a size of the selected replacement standard format character string,
wherein if the at least one replacement non-standard format character string candidate does not include the replacement non-standard format character string candidate that matches the size of the character string region of the sample character string classified as the non-standard format character string, replacing the sample character string further comprises selecting, as the replacement non-standard format character string, a replacement non-standard format character string candidate whose number of characters is greater than a second threshold in relation to the size of the character string region of the sample character string classified as the non-standard format character string, from the at least one replacement non-standard format character string candidate, and reducing a size of the selected replacement non-standard format character string,
wherein if the replacement standard format character string that has been reduced in size is less than a third threshold, replacing the sample character string further comprises selecting, as the replacement standard format character string, a replacement standard format character string candidate having a largest number of characters, from at least one replacement standard format character string candidate whose number of characters is less than the third threshold in relation to the size of the character string region of the sample character string classified as the standard format character string, and
wherein if the replacement non-standard format character string that has been reduced in size is less than a fourth threshold, the replacing the sample character string further comprises selecting, as the replacement non-standard format character string, a replacement non-standard format character string candidate having a largest number of characters, from at least one replacement non-standard format character string candidate whose number of characters is less than the fourth threshold in relation to the size of the character string region of the sample character string classified as the non-standard format character string.

6. A template management method comprising:
classifying, in response to reception of a template used to create a design and including a sample character string previously created as a sample, the sample character string as one of a standard format character string and a non-standard format character string;
classifying the sample character string classified as the standard format character string into a standard format character string group according to a representation format of the sample character string;
classifying the sample character string classified as the non-standard format character string into a non-standard format character string group according to content of the sample character string;
replacing the sample character string classified into the standard format character string group with a replacement standard format character string, the replacement standard format character string being associated with the standard format character string group and represented in a representation format corresponding to the sample character string; and replacing the sample character string classified into the non-standard format character string group with a replacement non-standard format character string, the replacement non-standard format character string being associated with the non-standard format character string group and represented in a different language from the sample character string, wherein the sample character string is included in a character string region that is determined in advance in the template, and wherein replacing the sample character string further comprises selecting, as the replacement standard format character string, a replacement standard format character string candidate having a number of characters that match a size of the character string region of the sample character string classified as the standard format character string, from at least one replacement standard format character string candidate associated with the standard format character string group, and selecting, as the replacement non-standard format character string, a replacement non-standard format character string candidate having a number of characters that match a size of the character string region of the sample character string classified as the non-standard format character string, from at least one replacement non-standard format character string candidate associated with the non-standard format character string group, wherein if the at least one replacement standard format character string candidate does not include the replacement standard format character string candidate that matches the size of the character string region of the sample character string classified as the standard format character string, replacing the sample character string further comprises selecting, as the replacement standard format character string, a replacement standard format character string candidate whose number of characters is greater than a first threshold in relation to the size of the character string region of the sample character string classified as the standard format character string, from the at least one replacement standard format character string candidate, and reducing a size of the selected replacement standard format character string, wherein if the at least one replacement non-standard format character string candidate does not include the replacement non-standard format character string candidate that matches the size of the character string region of the sample character string classified as the non-standard format character string, replacing the sample character string further comprises selecting, as the replacement non-standard format character string, a replacement non-standard format character string candidate whose number of characters is greater than a second threshold in relation to the size of the character string region of the sample character string classified as the non-standard format character string, from the at least one replacement non-standard format character string candidate, and reducing a size of the selected replacement non-standard format character string, wherein if the replacement standard format character string that has been reduced in size is less than a third threshold, replacing the sample character string further comprises selecting, as the replacement standard format character string, a replacement standard format character string candidate having a largest number of characters, from at least one replacement standard format character string candidate whose number of characters is less than the third threshold in relation to the size of the character string region of the sample character string classified as the standard format character string, and wherein if the replacement non-standard format character string that has been reduced in size is less than a fourth threshold, the replacing the sample character string further comprises selecting, as the replacement non-standard format character string, a replacement non-standard format character string candidate having a largest number of characters, from at least one replacement non-standard format character string candidate whose number of characters is less than the fourth threshold in relation to the size of the character string region of the sample character string classified as the non-standard format character string.

7. A template management apparatus comprising:

at least one hardware processor configured to implement:

in response to reception of a template used to create a design and including a sample character string previously created as a sample, classifying the sample character string as one of a standard format character string and a non-standard format character string;

classifying the sample character string classified as the standard format character string into a standard format character string group according to a representation format of the sample character string, and classifies the sample character string classified as the non-standard format character string into a non-standard format character string group according to content of the sample character string; and performing a replacement including replacing the sample character string classified into the standard format character string group with a replacement standard format character string, the replacement standard format character string being associated with the standard format character string group and represented in a representation format corresponding to the sample character string, and replacing the sample character string classified into the non-standard format character string group with a replacement non-standard format character string, the replacement non-standard format character string being associated with the non-standard format character string group and represented in a different language from the sample character string, wherein:

the sample character string is included in a character string region that is determined in advance in the template; and the replacement further comprises:

selecting, as the replacement standard format character string, a replacement standard format character string candidate having a number of characters that match a size of the character string region of the sample character string classified as the standard format character string, from at least one replacement standard format character string candidate associated with the standard format character string group, and selecting, as the replacement non-standard format character string, a replacement non-standard format character string candidate having a number of characters that match a size of the character string region of the sample character string classified as the non-standard format character string, from at least one replacement non-standard format character string candidate associated with the non-standard format character string group, if the at least one replacement standard format character string candidate does not include the replacement standard format character string candidate that matches the size of the character string region of the sample character string classified as the standard format character string, the replacement further comprises selecting, as the replacement standard format character string, a replacement standard format character string candidate whose number of characters is greater than a first threshold in relation to the size of the character string region of the sample character string classified as the standard format character string, from the at least one replacement standard format character string candidate, and reducing a size of the selected replacement standard format character string, if the at least one replacement non-standard format character string candidate does not include the replacement non-standard format character string candidate that matches the size of the character string region of the sample character string classified as the non-standard format character string, the replacement further comprises selecting, as the replacement non-standard format character string, a replacement non-standard format character string candidate whose number of characters is greater than a second threshold in relation to the size of the character string region of the sample character string classified as the non-standard format character string, from the at least one replacement non-standard format character string candidate, and reducing a size of the selected replacement non-standard format character string, if the at least one replacement standard format character string candidate does not include the replacement standard format character string candidate whose number of characters is greater than the first threshold, the replacement further comprises selecting, as the replacement standard format character string, a replacement standard format character string candidate having a largest number of characters, from at least one replacement standard format character string candidate whose number of characters is less than a third threshold in relation to the size of the character string region of the sample character string classified as the standard format character string, and if the at least one replacement non-standard format character string candidate does not include the replacement non-standard format character string candidate whose number of characters is greater than the second threshold, the replacement further comprises selecting, as the replacement non-standard format character string, a replacement non-standard format character string candidate having a largest number of characters, from at least one replacement non-standard format character string candidate whose number of characters is less than a fourth threshold in relation to the size of the character string region of the sample character string classified as the non-standard format character string.

8. The template management apparatus according to claim 1, wherein the at least one hardware processor is further configured to implement, in response to determining that a first size is greater than the size of the sample character string classified into the non-standard format character string group, wherein the first size comprises a first area of the replacement non-standard format character string with respect to the template:

selecting a second replacement non-standard format character string in the different language from the sample character string classified into the non-standard format character string group, the second replacement non-standard format character string comprises different text than the replacement non-standard format character string, determining a proportion between the size of the sample character string and a size of the second replacement non-standard format character string in which the font size of the second replacement non-standard format character string in the different language is set to the same font size as that of the sample character string, and replacing the sample character string classified into the non-standard format character group with the second replacement non-standard format character string in response to determining that the proportion is within a predetermined range.

* * * * *